July 28, 1925.

H. E. STAHL 1,547,835

ELECTRICAL CONTROLLING MECHANISM

Original Filed Sept. 23, 1922    6 Sheets-Sheet 1

INVENTOR:
Harry E. Stahl.
BY
ATTORNEYS.

July 28, 1925.

H. E. STAHL 1,547,835

ELECTRICAL CONTROLLING MECHANISM

Original Filed Sept. 23, 1922      6 Sheets-Sheet 2

INVENTOR:
Harry E. Stahl.
BY
ATTORNEYS.

July 28, 1925.
H. E. STAHL
ELECTRICAL CONTROLLING MECHANISM
Original Filed Sept. 23, 1922    6 Sheets-Sheet 3
1,547,835
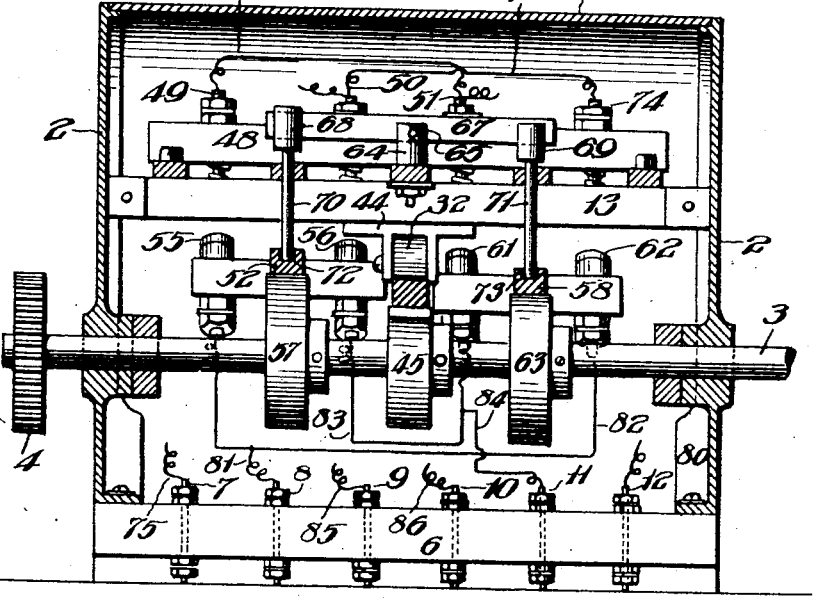
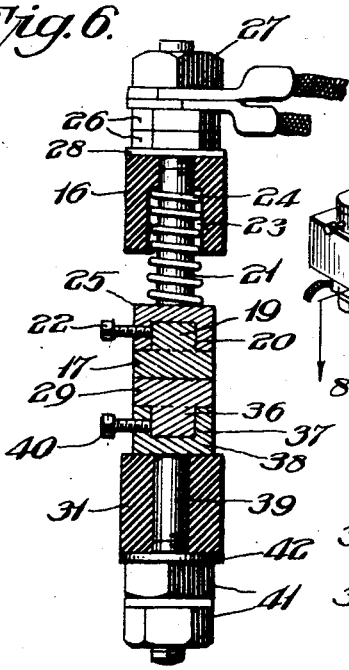
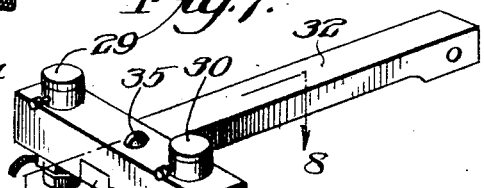
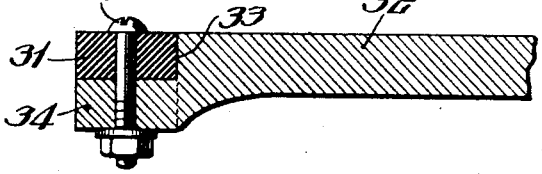
INVENTOR:
Harry E. Stahl
BY
ATTORNEYS.

July 28, 1925.

H. E. STAHL 1,547,835

ELECTRICAL CONTROLLING MECHANISM

Original Filed Sept. 23, 1922     6 Sheets-Sheet 4

INVENTOR:
Harry E. Stahl
BY
ATTORNEYS.

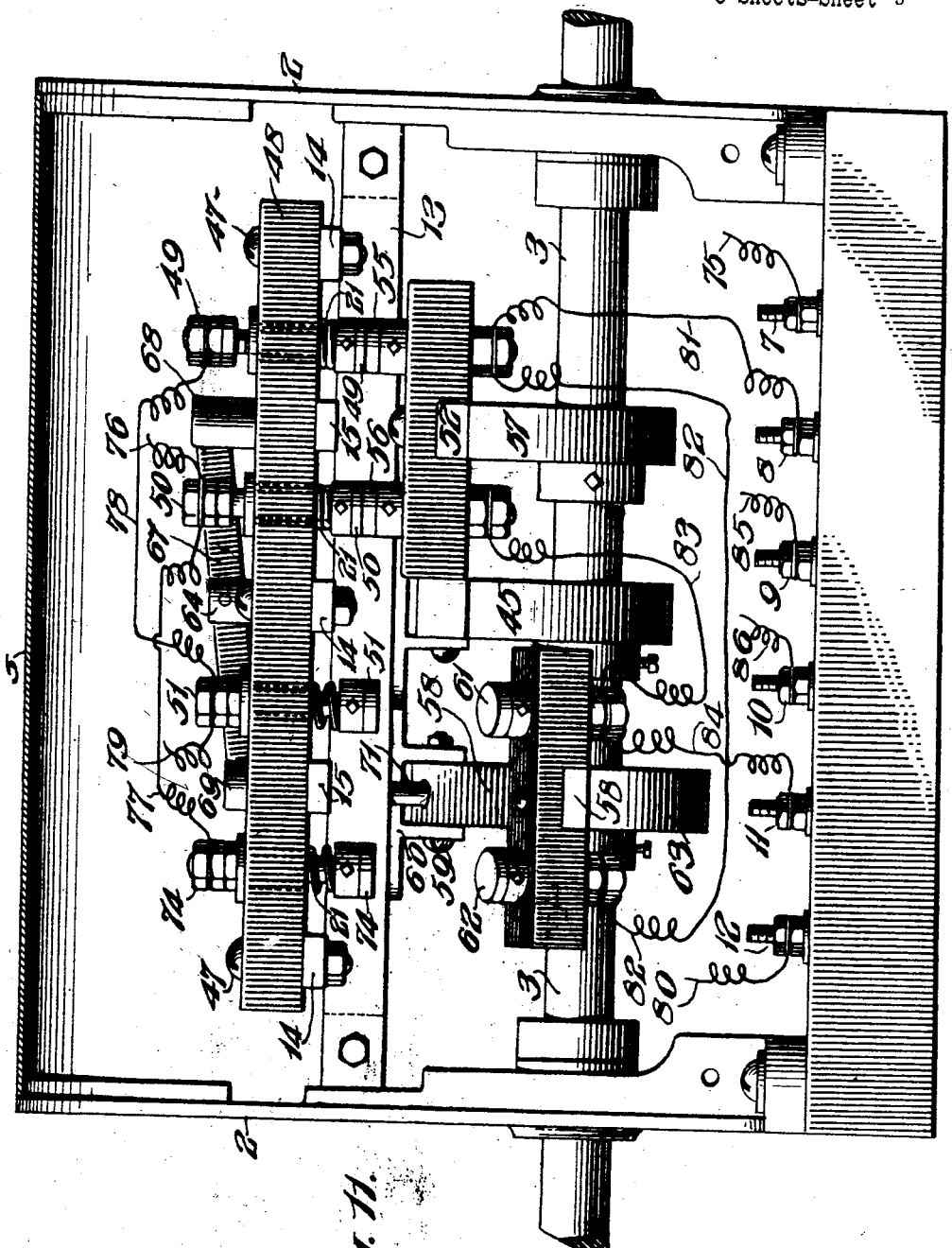

July 28, 1925.
H. E. STAHL
1,547,835
ELECTRICAL CONTROLLING MECHANISM
Original Filed Sept. 23, 1922      6 Sheets-Sheet 6
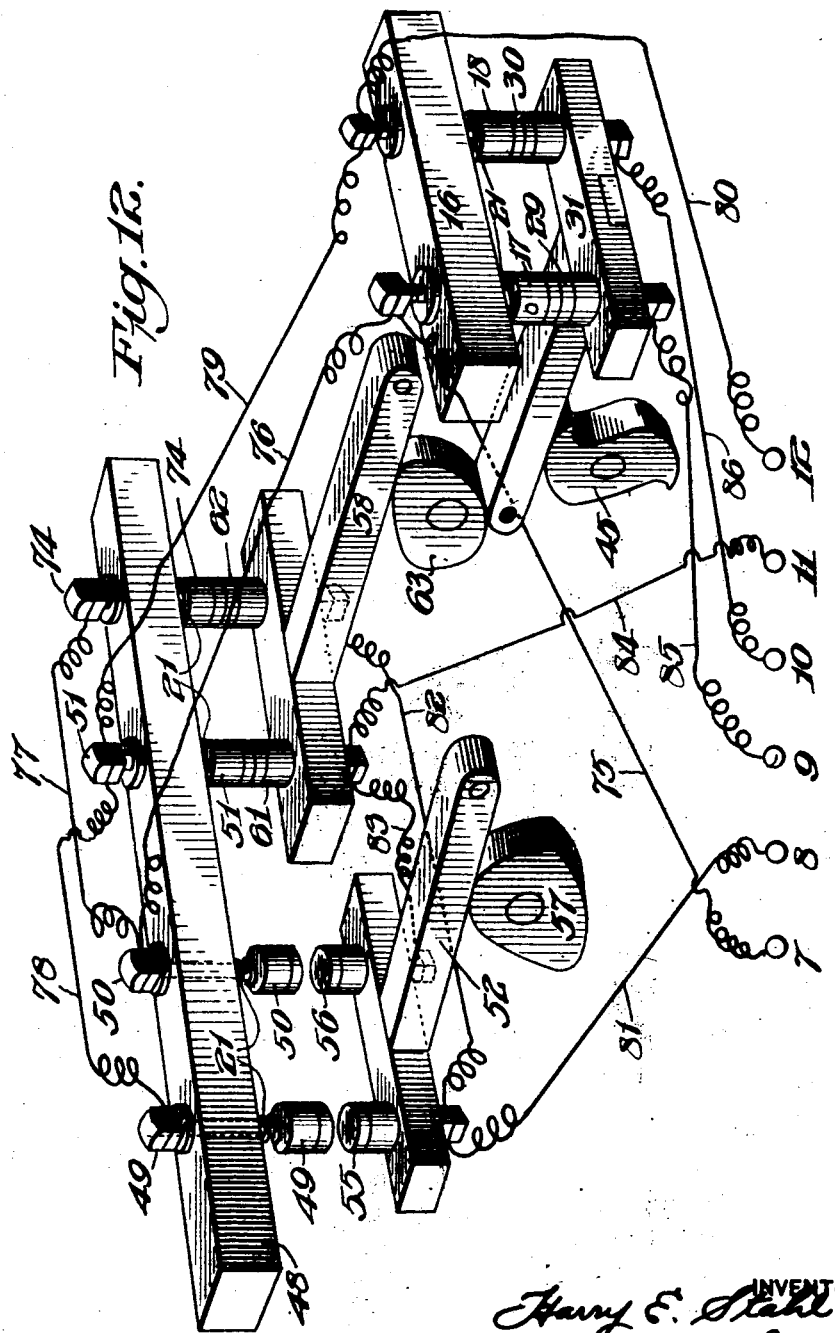
INVENTOR:
Harry E. Stahl.
BY
Niedersheim Fairbanks
ATTORNEYS.

Patented July 28, 1925.

1,547,835

UNITED STATES PATENT OFFICE.

HARRY E. STAHL, OF TRENTON, NEW JERSEY, ASSIGNOR TO THE WILLEY COMPANY, INCORPORATED, OF PHILADELPHIA, PENNSYLVANIA, A CORPORATION OF PENNSYLVANIA.

ELECTRICAL CONTROLLING MECHANISM.

Original application filed September 23, 1922, Serial No. 590,120. Divided and this application filed June 1, 1923. Serial No. 642,878.

*To all whom it may concern:*

Be it known that I, HARRY E. STAHL, a citizen of the United States, residing at Trenton, county of Mercer, State of New Jersey, have invented a new and useful Electrical Controlling Mechanism, of which the following is a specification.

One object of my present invention is to devise a novel construction and arrangement of an electric controller wherein certain of the co-operating contacts automatically control at the proper time the introduction into and the cutting out from the working circuit, of resistance which is of such strength that a sudden shock and strain is not imparted to the driven mechanism.

Another object is to devise a novel electric controller in which the co-operating contacts engage with each other without a wiping action, such contacts being electrically connected with the different phases of a motor whereby after the mechanism being driven has travelled a desired distance or made a desired number of revolutions in one direction, its direction of revolution will be reversed for a desired number of revolutions.

Other objects are to devise an electric controller in which the timing will be accurate and can be adjusted to vary the time at which the different operations are to take place, in which the contact points can be easily and quickly replaced, in which mechanism of different sizes and power can be controlled, in which the contacts opening one circuit are positively disengaged prior to the closing of another circuit, and in which by varying the speed of the pilot motor which drives the controller the number of reversals in a given time of the mechanisms driven by the controller are correspondingly varied.

With the above and other objects in view as will be hereinafter more clearly set forth, my invention comprehends a novel construction and arrangement of an electric controller.

It further comprehends a novel wiring diagram. This application is a division of my application Serial No. 590,120, filed September 23, 1922, Patent No. 1,459,756.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 5 represents a section on line 5—5 of Figure 1.

Figure 6 represents a section, on an enlarged scale, of two contact members and certain of their adjuncts.

Figure 7 represents, in perspective and in detached position, a pair of contacts, their insulated bar and rock arm.

Figure 8 represents a section on line 8—8 of Figure 7.

Figure 11 represents a front elevation of the controller.

Figure 1:
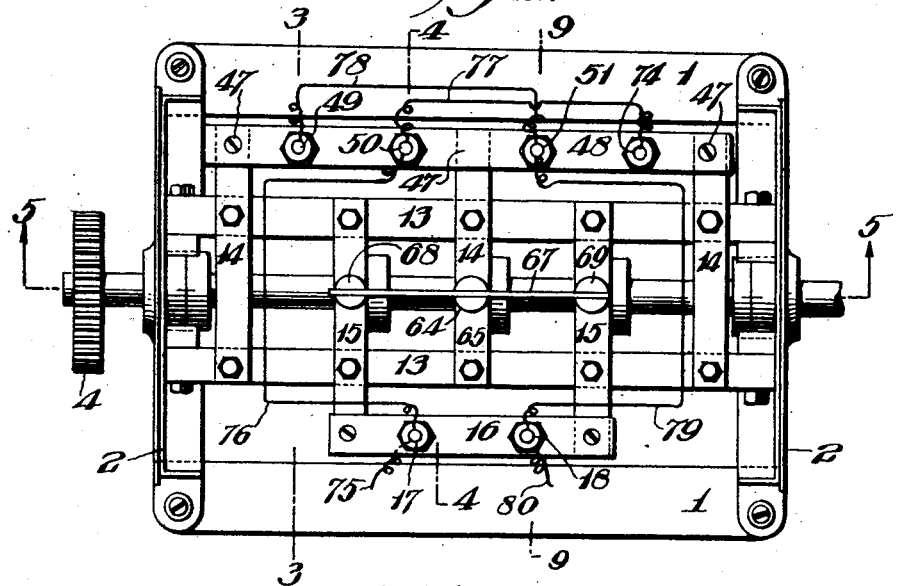
Figure 1 represents a top plan view of a controlling mechanism, embodying my invention.

Figure 12 a diagrammatic view showing in perspective the contacts and certain of their adjuncts.

Similar numerals of reference indicate corresponding parts.

Referring to the drawings.

1 designates the base or supporting framework which, as illustrated, is in the form of spaced bars, to which are connected the end members 2. 3 designates the driven shaft, which is journaled in the end members 2 and provided with a gear 4 by means of which it is continuously driven by any desired source of power and, in practice, preferably by a pilot motor. The end members 2 are adapted to receive a removable casing 5, which contributes with said end members to inclose the working parts. The end members are connected by a binding post support 6, which carries the binding posts 7, 8, 9, 10, 11 and 12, respectively. The end members 2 are connected above the shaft 3 by means of the spaced longitudinally extending bars 13 which carry the cross bars 14 and the cross bars 15. The cross bars 15, see Figure 1, are connected at their free ends by means of a bar of insulating material 16, in which is mounted the contacts 17 and 18, each of which is constructed and mounted in the same manner, so that a description of one will suffice for both.

Referring now more particularly to Figure 6, the contact 17 has a rearward extension 19 which is received in the recess 20 in the lower end of a headed rod 21, and is secured in place by means of a set screw 22. The rod 21 passes through the bar 16, which latter is provided with an enlarged recess 23, in which is positioned a spring 24, which bears against a head 25 of the rod 21, so that the tendency of the spring is to move the contact 17 into its lowermost position. The upper end of the rod 21 is threaded to receive the nuts 26, one of which serves as a lock nut, and a nut 27 is provided to secure in place the conductor terminals. The lower nut 26 preferably bears against a washer 28. The contacts 17 and 18 co-operate respectively with the contacts 29 and 30, see Figures 2 and 7.

These contacts 29 and 30 are carried by an insulated support 31, preferably in the form of a bar secured in any desired manner to a rock arm 32, and, as illustrated, the insulating support 31 is recessed, as at 33, to receive the extension 34 of the rock arm 32, said extension being secured in position by means of a fastening device 35.

Figure 4:
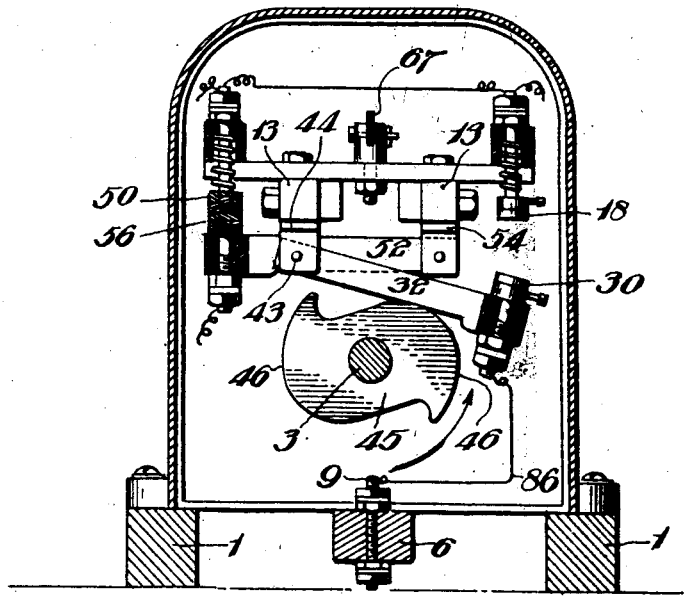
Figure 4 represents a section on line 4—4 of Figure 1.
Figure 9:
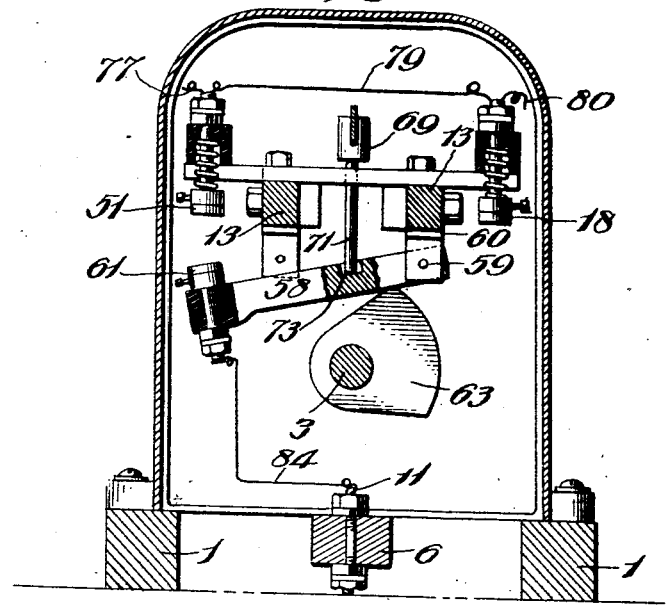
Figure 9 represents a section on line 9—9 of Figure 1.

Each rocker arm contacts such as, for example, the contact 29, see Figures 6 and 7, is provided with a stem 36 which is seated in a recess 37 in the head 38 of a rod 39, and is secured in position by means of a fastening device 40, such as, for example, the set screw shown. The rod 39 passes through the insulating support 31, and has its outer end threaded to receive the nuts 41, a washer 42 being preferably provided which bears against the insulated support 31. Since all of the contacts carried by the different rocker arms are constructed and secured in position in a similar manner, a detailed description of one will suffice for all. The rocker arm 32 at its inner end is pivotally connected at 43 to a bracket 44, see Figure 4.

This rocker arm 32 is actuated by a cam 45 fixed to the shaft 3 and having the operative cam surfaces 46.

Referring now to Figure 1, the cross bars 14 have connected with them, by means of fastening devices 47, an insulated contact support 48, which is in the form of a bar, in which are resiliently mounted a pair of contact members 49 and 50, and a pair of contact members 51 and 74 which are resiliently mounted in a similar manner to that already described with reference to Figure 6.

52 designates a rock arm, pivotally carried at 53, by a bracket 54, which is secured to one of the bars 13. The rock arm 52 is constructed in a similar manner to the rock arm 32 and carries a pair of contact devices 55 and 56. The rock arm 52 is controlled by means of a cam 57 on the shaft 3.

58 designates a rock arm, pivotally supported at 59, in the bracket 60, carried by one of the bars 13. This rock arm carries, in a similar manner to the rock arms 32 and 52, a pair of contact members 61 and 62, respectively. This rock arm 58 is controlled by means of a cam 63 carried by the shaft 3. One of the cross bars 14 carries a slotted post 64 in which is pivoted, at 65, a lever 67, the free ends of which are positioned in the slots of the heads 68 and 69 of the rods 70 and 71, respectively, said rods passing through apertures in the cross bars 15. The rod 70, connected with the head 68, bears at its lower end against the bottom wall of the recess 72 in the rock arm 52.

In a similar manner, the plunger rod 71 of the plunger head 69 bears against the bottom wall of a recess 73 in the rock arm 58.

Figure 2:
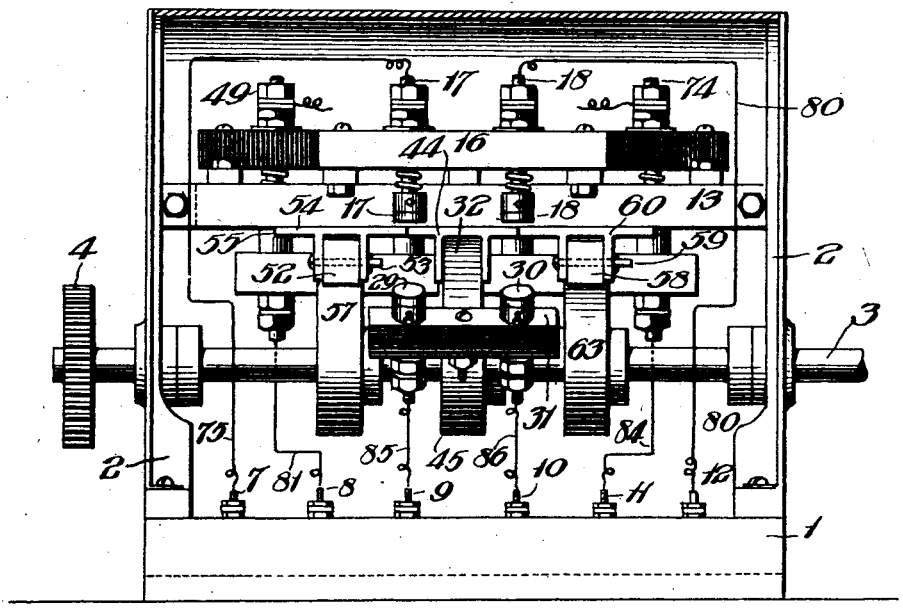
Figure 2 represents a rear elevation, partly in section, of Figure 1.
Figure 3:
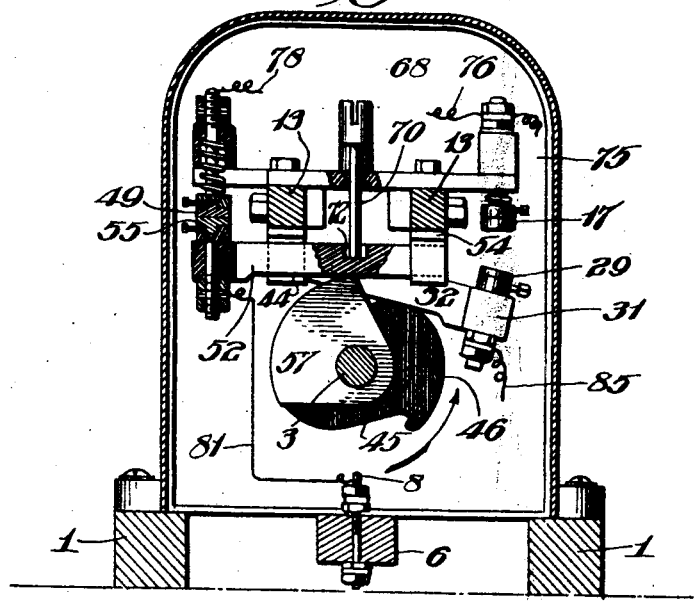
Figure 3 represents a section on line 3—3 of Figure 1.

The binding post 7 is connected by a line 75, see Figure 2, with the contact member 17. The contact member 17 is connected by a line 76 with the contact member 50. The contact member 50 is connected by a line 77 with the contact member 74. The contact members 49 and 51 are connected by a line 78. The contact member 18 is connected with the contact member 51 by a line 79. The contact member 18 is connected by a line 80 with the binding post 12. The binding post 8 is connected by a line 81 with the contact member 55. The contact member 55 is connected by a line 82 with the contact member 61. The contact members 56 and 61 are connected to each other by a line 83 and with the binding post 11 by means of a line 84. The binding post 9 is connected with the contact member 29 by means of a line 85, see Figure 2, and the binding post 10 is connected with the contact member 30 by means of a line 86.

Figure 10:
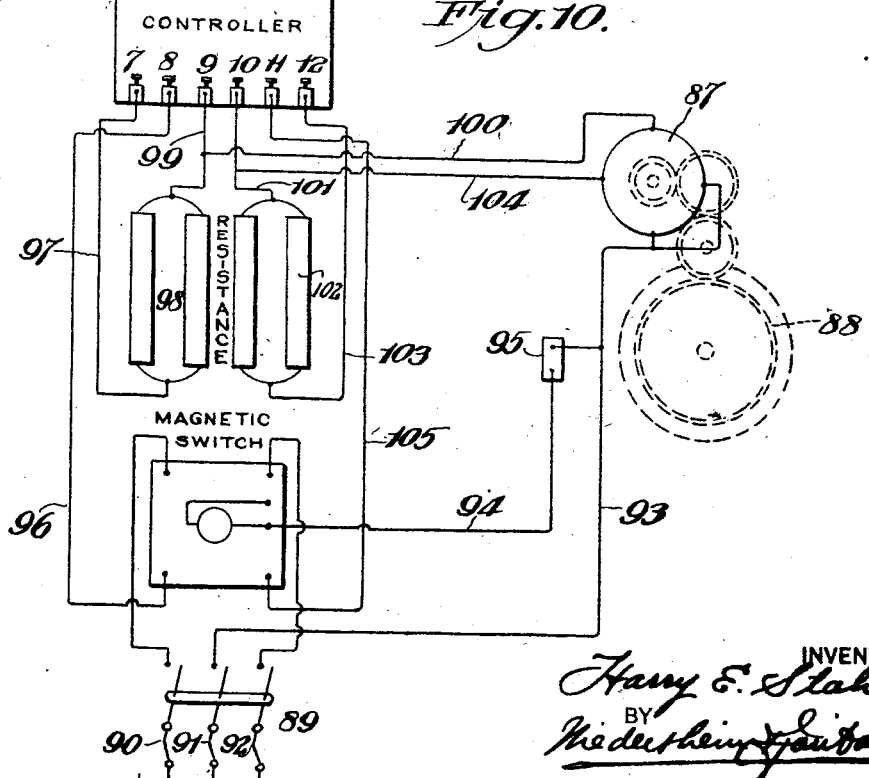
Figure 10 represents a wiring diagram.

Referring now more particularly to Figure 10, 87 designates an electric motor which is intergeared with the mechanism to be controlled, for example, a washing machine 88 of the oscillatory type. 89 designates an electric main line switch having the lines 90, 91 and 92, the line 91 when the switch is closed leading by line 93 to one of the motor windings. A line 94 connects the magnetic switch 89 with the line 93 and is provided with a manually controlled switch 95. A line 96 is connected with the magnetic switch and with the binding post 8 of the controller. A line 97 connects the binding post 7 with the resistance 98 which latter is connected by line 99 with the binding post 9 of the controller. A line 100 is connected with line 99 and a winding of the motor 87. A line 101 is connected with the binding post 10 and with a resistance 102 which in turn is connected by line 103 with the binding post 12. A line 104 connects line 101 with a winding of the motor. A line 105 connects the magnetic switch with the binding post 11. The lines 100 and 104 connect with one winding of the motor 87 and the lines 93 and 94 connect with the other winding of the motor 87. When the manually controlled switch 95 is operated to close the circuit, the circuit is closed through the magnetic switch. This enables one to time the reversing operation so that two machines will not be reversing at the same time.

In the operation, it will be understood that the shaft 3 is revolved at a desired or predetermined speed. The cam 45 actuates the rock arm 32 to cause the contacts 29 and 30 to engage respectively with the contacts 17 and 18 at which time the resistance 98 or 102 is cut out while when such contacts are out of engagement the resistance 98 or 102 is in circuit. When the resistance is in, the binding posts 7 and 8 are short circuited while when the resistance is out, the binding posts 8 and 9 are short circuited. When the direction of the motor is reversed when the resistance is in, the binding posts 11 and 12 are short circuited and when the resistance is out, the binding posts 10 and 11 are short circuited. The current flows from the magnetic switch to line 96 through the binding post 8 and from the magnetic switch through the line 105 to the binding post 11. The line 93 may be considered as the neutral line connected to the two different phases of the motor winding. During the revolution of the driving shaft, the current passes through the resistance 98 and as soon as the contacts 29 and 30 engage the contacts 17 and 18, the resistance 98 is cut out and the current passes by line 100 to one phase of the motor winding. On the further revolution of the shafts 3, the resistance 102 is cut in, and as soon as the further revolution of the cam 45 raises the rock arm 32 to cause the contacts 29 and 30 to again engage the contacts 17 and 18, the resistance 102 is cut out and the current passes from binding post 10 to line 104 to the other phase of the motor winding so that the direction of rotation of the motor and the parts driven thereby is reversed.

The cams 45, 57 and 63 are adjustably mounted on the shaft 3 in order that the timing of the different operations may be varied as desired by rotatively adjusting the positions of such cams on the shaft 3, as will be apparent to those skilled in this art.

It will be noted that as one rock arm 58 or 52 is raised, the other rock arm 58 or 52 is positively lowered due to the provision of the plungers 71 and 70 and the lever 67 cooperating therewith, so that there is no possibility of the contacts 61 and 62 being in engagement with the contacts 51 and 74 at the same time that the contacts 55 and 56 are in engagement with their co-operating contacts 49 and 50, respectively, thereby preventing the possibility of a short circuit taking place at such points.

It will now be apparent that I have devised a new and useful electrical controlling mechanism which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. A controller comprising resiliently mounted stationary contracts arranged in pairs, a pair of rock arms, a cross bar of insulating material on each rock arm, a pair of contacts on each cross bar to co-operate with a pair of said stationary contacts, a third pair of stationary contacts, a third rock arm, a cross bar of insulating material on said third rock arm, a pair of contacts on said third cross bar to co-operate with said third pair of stationary contacts, a driven shaft, and cams adjustably mounted thereon to actuate said rock arms, the fulcrum of said third rock arm being at one side of said cams, and the fulcrums of said pair of rock arms being at the opposite side of said cams.

2. A controller comprising resiliently mounted stationary contacts arranged in pairs, a pair of rock arms, a cross bar of insulating material on each rock arm, a pair of contacts on each cross bar to co-operate with a pair of said stationary contacts, a vertically disposed plunger for each rock arm and bearing at its lower end against it, a lever having its free ends engaging the upper ends of said plungers to cause one to move downwardly when the other moves upwardly, a third pair of stationary contacts, a third rock arm, a cross bar of insulating material on said third rock arm, a pair of contacts on said third cross bar to co-operate with said third pair of stationary contacts, a driven shaft, and cams adjustably mounted thereon to actuate said rock arms, the fulcrum of said third rock arm being at one side of said cams, and the fulcrums of said pair of rock arms being at the opposite side of said cams.

HARRY E. STAHL.

Witnesses:
F. R. ZELLEY,
I. T. CHAMBERS.